US010843639B2

(12) United States Patent
Morishita et al.

(10) Patent No.: US 10,843,639 B2
(45) Date of Patent: Nov. 24, 2020

(54) PILLAR GARNISH

(71) Applicants: TOKAI KOGYO CO., LTD., Obu (JP); TAKARAKASEI KOGYO CO., LTD., Nishio (JP)

(72) Inventors: Motohiro Morishita, Obu (JP); Kohji Kamiya, Obu (JP); Renji Maki, Obu (JP); Hiroyuki Taki, Obu (JP)

(73) Assignees: TOKAI KOGYO CO., LTD., Obu (JP); TAKARAKASEI KOGYO., LTD., Nishio (JP)

( * ) Notice: Subject to any disclaimer, the term of this patent is extended or adjusted under 35 U.S.C. 154(b) by 0 days.

(21) Appl. No.: 16/638,077

(22) PCT Filed: Aug. 2, 2018

(86) PCT No.: PCT/JP2018/029105
§ 371 (c)(1),
(2) Date: Feb. 10, 2020

(87) PCT Pub. No.: WO2019/031391
PCT Pub. Date: Feb. 14, 2019

(65) Prior Publication Data
US 2020/0215996 A1    Jul. 9, 2020

(30) Foreign Application Priority Data

Aug. 10, 2017    (JP) .................................. 2017-155978

(51) Int. Cl.
*B60J 9/00*        (2006.01)
*B60R 13/02*       (2006.01)
(52) U.S. Cl.
CPC ................................ *B60R 13/025* (2013.01)

(58) Field of Classification Search
CPC ... B60R 21/213; B60R 13/025; B60R 21/232; B60R 13/0206; B60R 2021/161; B62D 25/04
See application file for complete search history.

(56) References Cited

U.S. PATENT DOCUMENTS 5,988,678 A * 11/1999 Nakamura ......... B60N 2/01525
24/297
2005/0189780 A1    9/2005 Hara et al.
(Continued)

FOREIGN PATENT DOCUMENTS

CN           1644429 A      7/2005
EP           3168085 A1     5/2017
(Continued)

OTHER PUBLICATIONS

Sep. 18, 2018 International Search Report issued in International Patent Application No. PCT/JP2018/029105.
(Continued)

*Primary Examiner* — Kiran B Patel
(74) *Attorney, Agent, or Firm* — Oliff PLC

(57) ABSTRACT

An elongated pillar garnish configured to be attached to a gap between a peripheral edge portion of a window pane of a vehicle and a pillar of the vehicle, the pillar garnish including: an elongated attachment member for attaching the pillar garnish to the gap; and an elongated decorative member assembled to a front surface side of the attachment member, in which the attachment member includes an elongated main body part, and a cover part provided to at least one end of the main body part in a longitudinal direction, in which the cover part has a covering portion covering at least a part of a front surface of the decorative member, and a supporting wall portion erected from the main body part toward the outer side and supporting the (Continued)

covering portion, and in which the supporting wall portion is provided along a direction intersecting with the longitudinal direction.

7 Claims, 7 Drawing Sheets

(56) References Cited

U.S. PATENT DOCUMENTS

| | | | | |
|---|---|---|---|---|
| 2007/0051823 A1* | 3/2007 | Amano | ............... | B60J 10/70 239/1 |
| 2008/0088156 A1* | 4/2008 | Sato | ............... | B62D 25/04 296/203.02 |
| 2013/0168515 A1* | 7/2013 | Yamamoto | ............ | B60R 13/0206 248/231.81 |
| 2015/0343888 A1 | 12/2015 | Nakamichi | | |
| 2016/0068115 A1* | 3/2016 | Inagawa | ............... | B60R 13/025 296/193.06 |
| 2016/0068116 A1* | 3/2016 | Inagawa | ............... | B60R 21/216 296/193.06 |
| 2016/0167614 A1* | 6/2016 | Inami | ............... | B60R 21/215 280/730.2 |
| 2017/0136965 A1 | 5/2017 | Schulte et al. | | |
| 2017/0291338 A1* | 10/2017 | Kamiya | ............... | B29C 45/44 |
| 2019/0039553 A1* | 2/2019 | Komura | ............... | B29C 65/548 |
| 2019/0152419 A1* | 5/2019 | Tanaka | ............... | B62D 25/04 |
| 2019/0217790 A1* | 7/2019 | Tanaka | ............... | B60S 1/54 |
| 2020/0062312 A1* | 2/2020 | Tanaka | ............... | B62D 25/04 |
| 2020/0156584 A1* | 5/2020 | Akagi | ............... | B60R 13/0275 |

FOREIGN PATENT DOCUMENTS

| | | |
|---|---|---|
| JP | 2004-224271 A | 8/2004 |
| JP | 2006-192975 A | 7/2006 |
| JP | 2009-119978 A | 6/2009 |
| JP | 2011-152870 A | 8/2011 |
| JP | 2015-227113 A | 12/2015 |
| JP | 2016-168943 A | 9/2016 |

OTHER PUBLICATIONS

Sep. 18, 2018 Written Opinion of the International Searching Authority issued in International Patent Application No. PCT/JP2018/029105.

Aug. 6, 2020 Office Action issued in Chinese Patent Application No. 201880052031.8.

* cited by examiner

[FIG. 1]
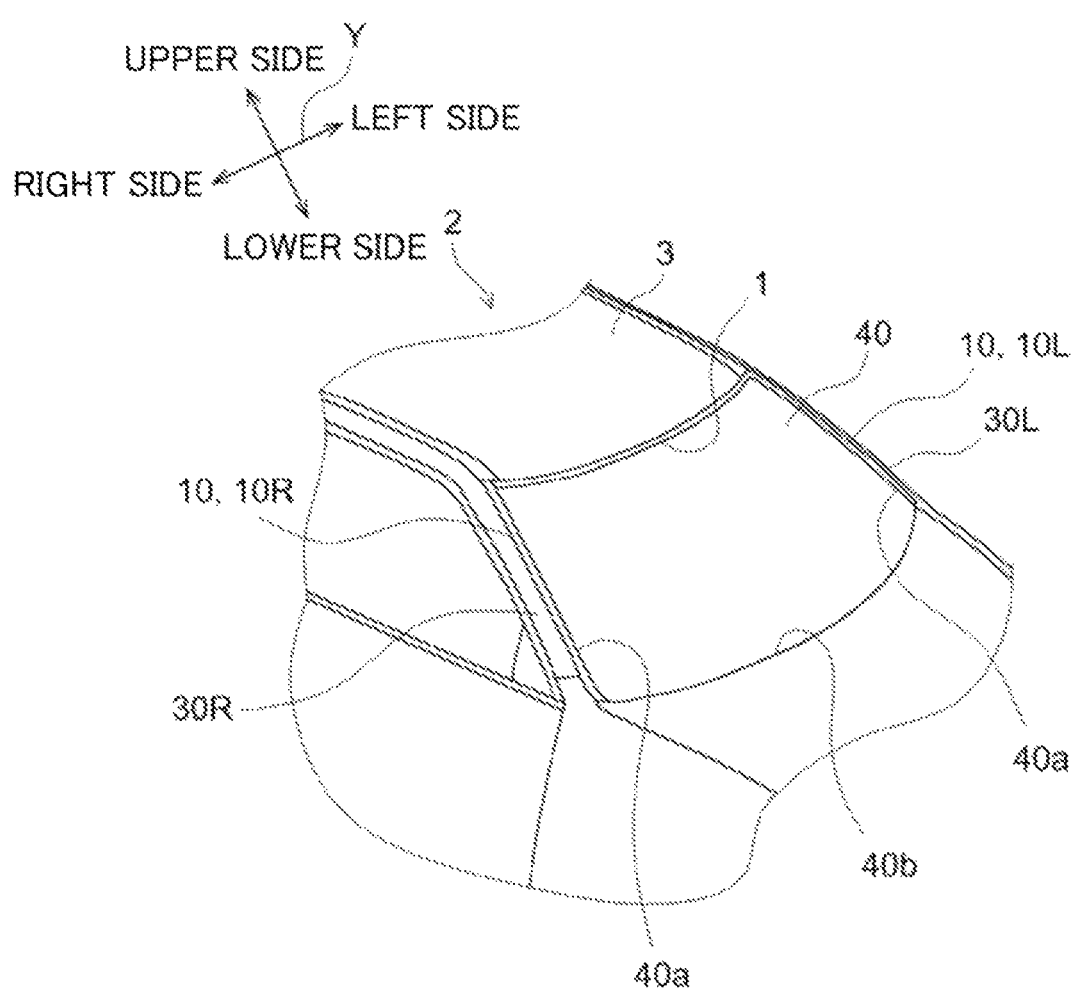

[FIG. 2]
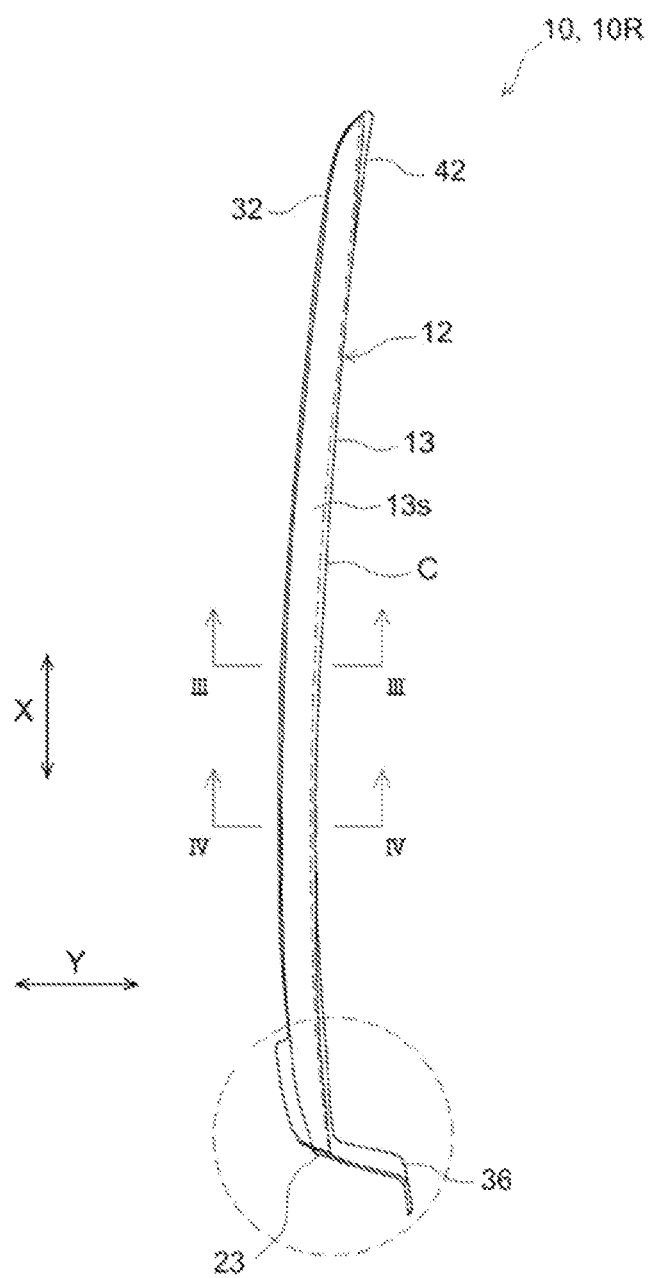

[FIG. 3]
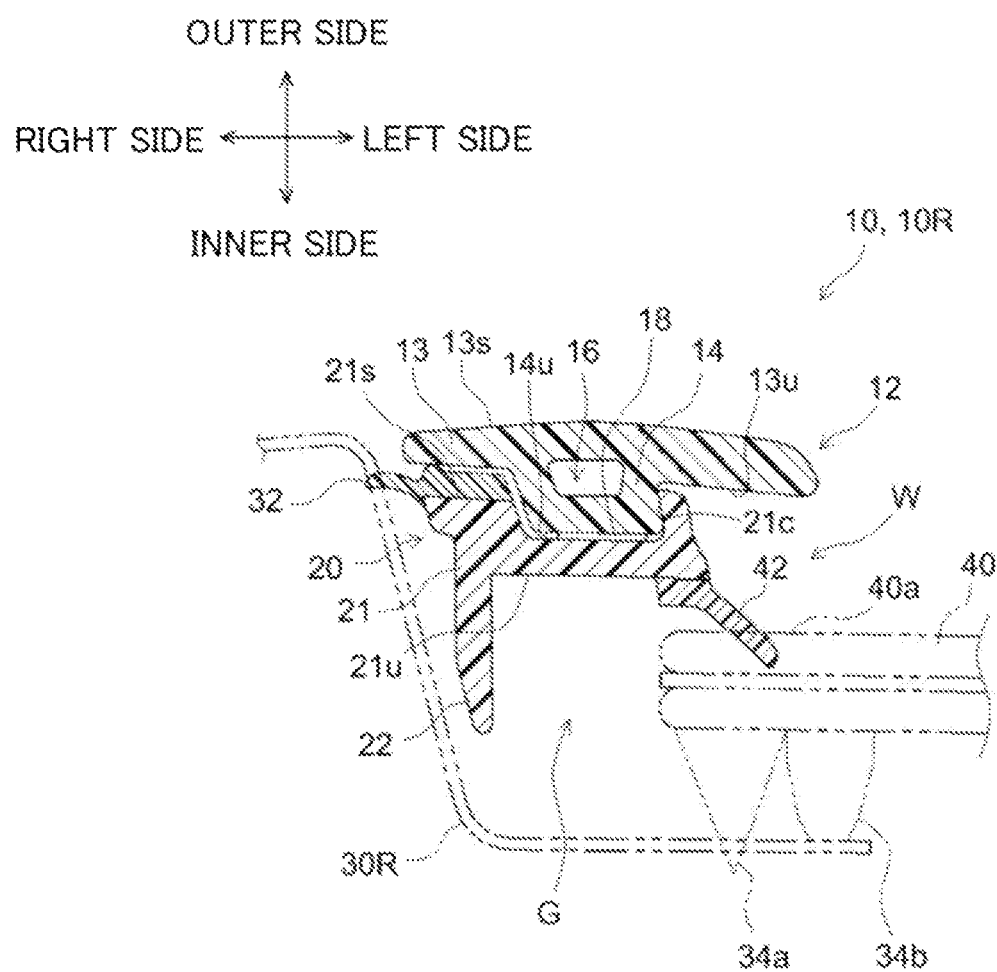

[FIG. 4]
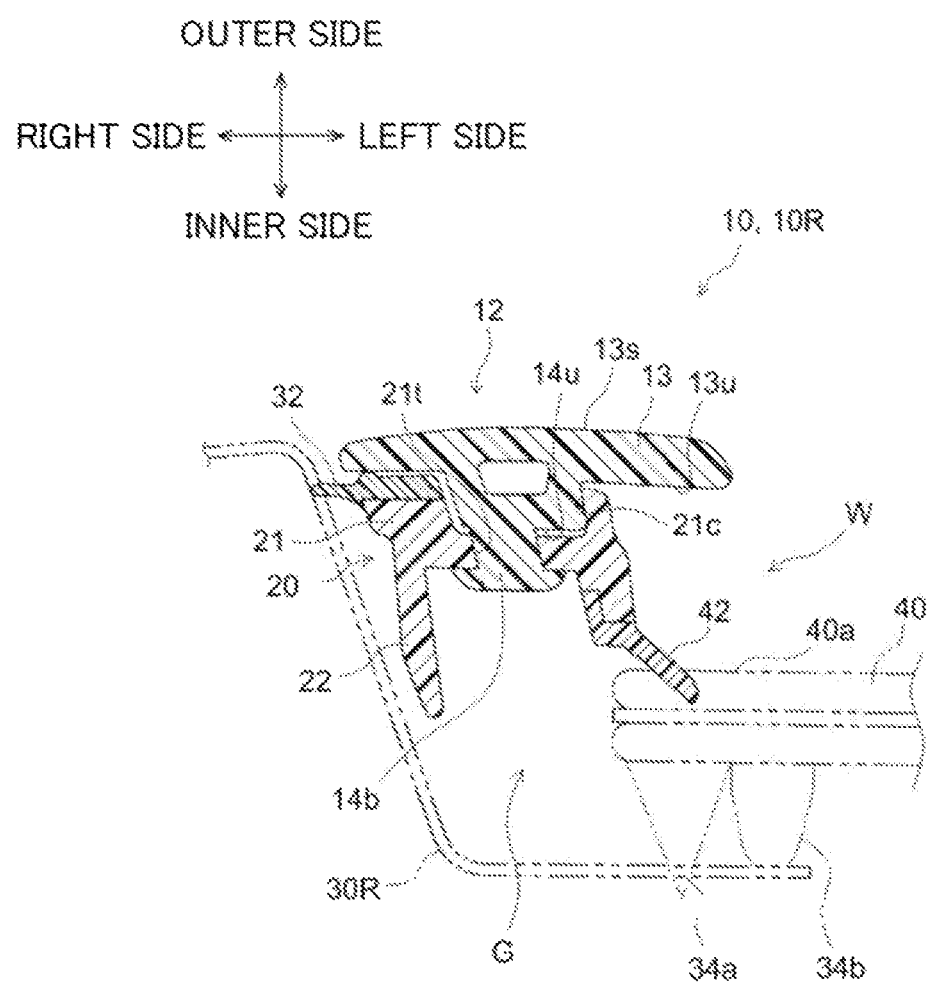

[FIG. 5A]
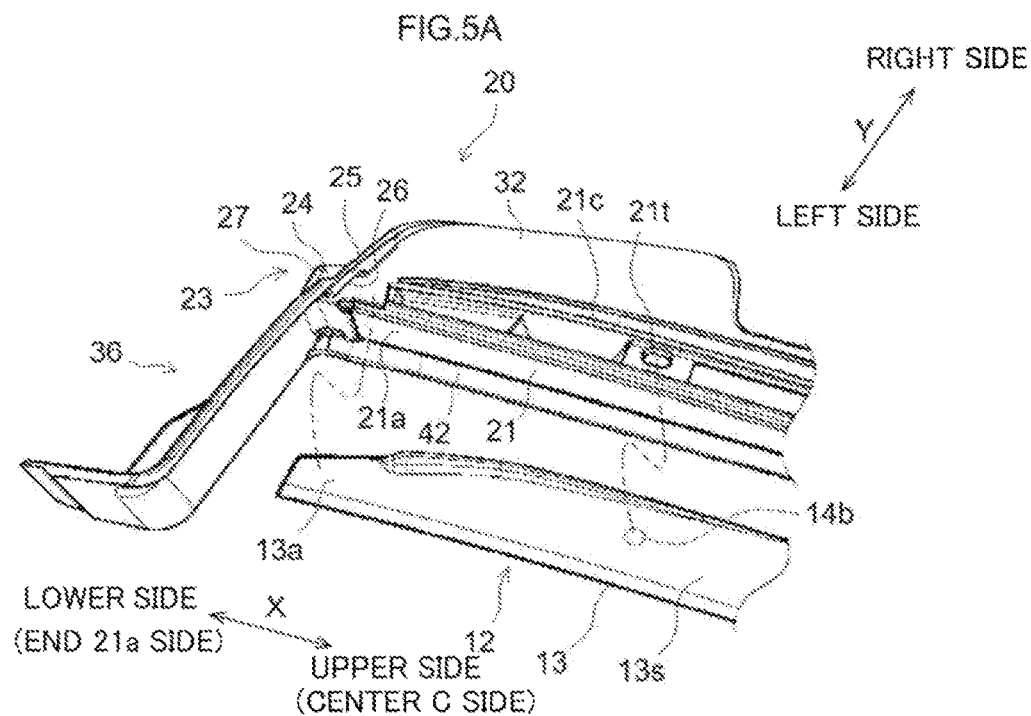
[FIG. 5B]
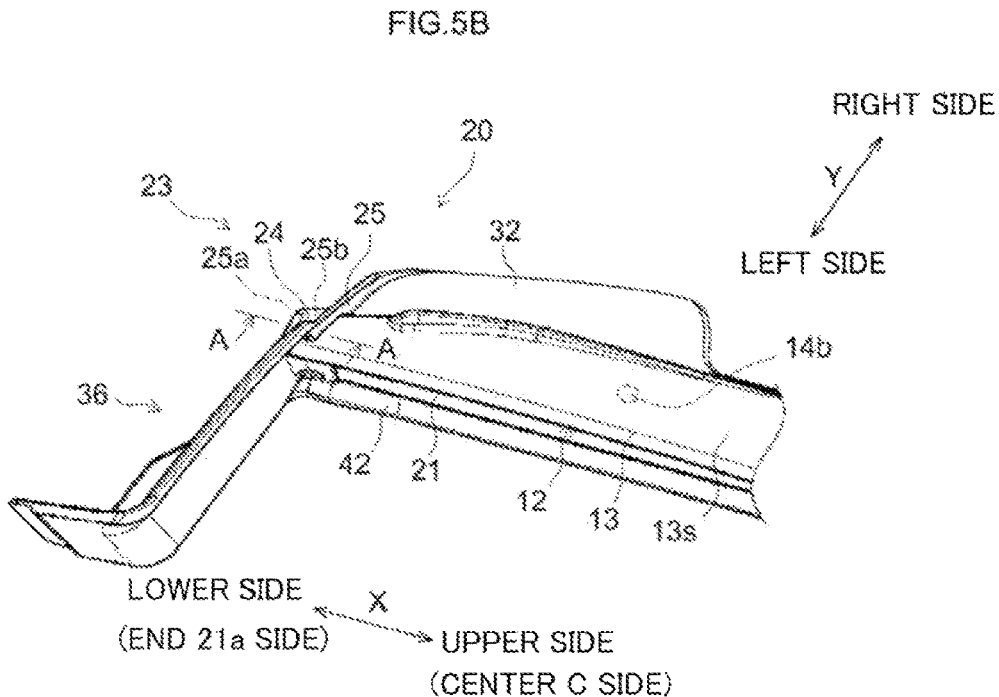

[FIG. 5C]
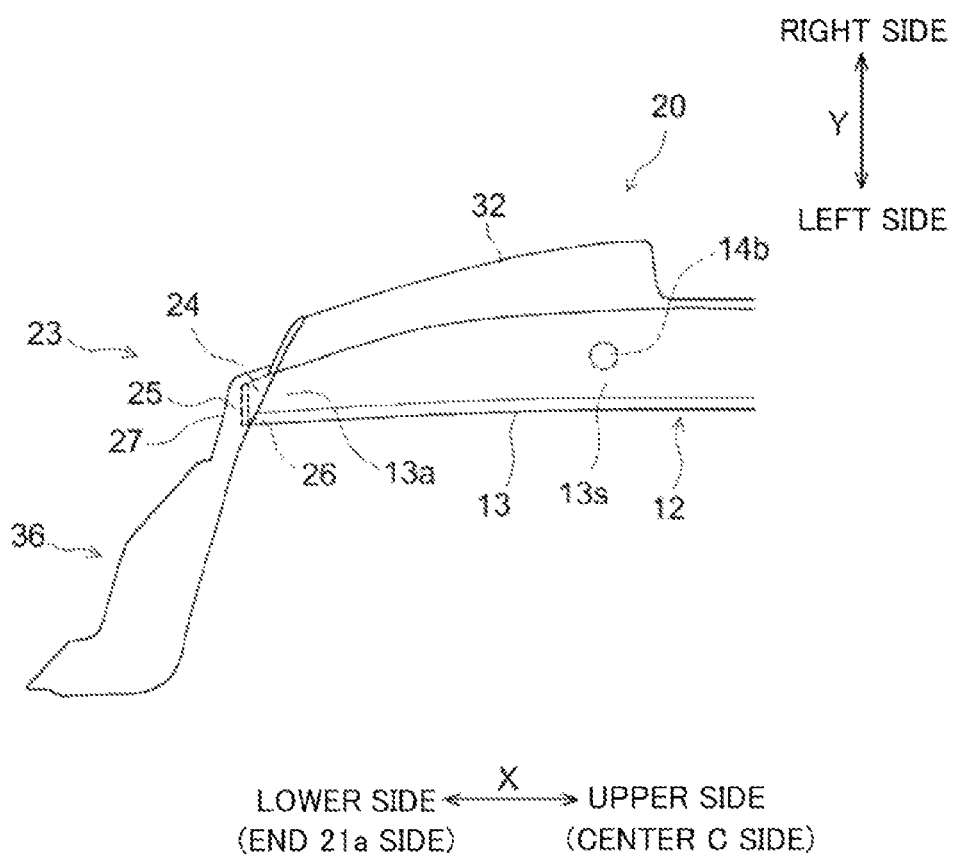

[FIG. 6]
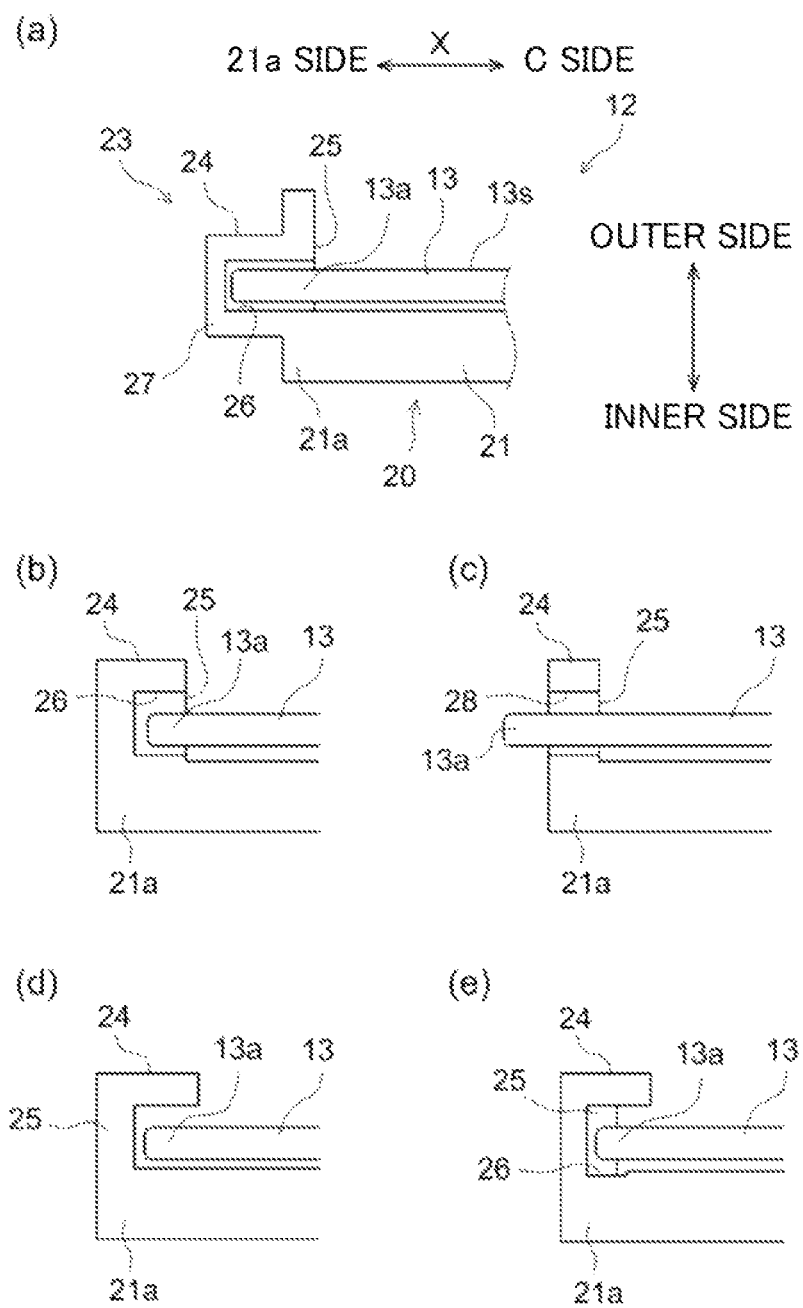

PILLAR GARNISH

TECHNICAL FIELD

The present relates to a pillar garnish to be provided to a window frame of a vehicle.

This application is based upon and claims the benefit of priority from prior Japanese patent application No. 2017-155978, filed on Aug. 10, 2017, the entire contents of which are incorporated herein by reference.

BACKGROUND ART

A pillar garnish is attached to a vehicle window of an automobile and the like along a gap between a pillar, which configures left and right side frame parts of a window frame of a vehicle body, and a window pane. The pillar garnish is a member that covers the gap decoratively. For example, PTL 1 discloses a pillar garnish including an elongated decorative molding and a dam member that configures a dam part configured to support the decorative molding on a rear surface side and to guide downward rainwater and the like between the decorative molding and a window pane.

In the pillar garnish disclosed in PTL 1, the decorative molding and the dam member are configured as separate members, which are integrally assembled for use.

CITATION LIST

Patent Literature

PTL 1: JP-A-2004-224271

SUMMARY OF INVENTION

Technical Problem

In such a pillar garnish, dimensional errors may occur due to thermal shrinkage, linear expansion and the like after molding as well as variation in products. Since the decorative molding and the dam member have dimensions in a longitudinal direction significantly greater than dimensions in a width direction, dimensional errors in the longitudinal direction are likely to occur. There is a problem that, when the dimensions of the decorative molding and the dam member deviate from predetermined ranges, a gap and a deviation occur between the decorative molding and the dam member at an end of the pillar garnish, so that an appearance is deteriorated.

The present invention has been made so as to solve the above problems, and an object thereof is to provide a pillar garnish capable of preventing deterioration in appearance due to dimensional errors between members when the pillar garnish is configured by a plurality of members.

Solution to Problem

The present invention conceived so as to solve the above problems is an elongated pillar garnish configured to be attached to a gap between a peripheral edge portion of a window pane of a vehicle and a pillar of the vehicle. The pillar garnish includes an elongated attachment member for attaching the pillar garnish to the gap, and an elongated decorative member assembled to a front surface side of the attachment member and disposed at an outer side of the vehicle. The attachment member includes an elongated main body part, and a cover part provided to at least one end of the main body part in a longitudinal direction, and the cover part has a covering portion covering at least a part of a front surface of the decorative member, and a supporting wall portion erected from the main body part toward the outer side and configured to support the covering portion. The supporting wall portion is provided along a direction intersecting with the longitudinal direction of the main body part.

According to the invention disclosed herein, the decorative member and the attachment member can be configured as separate members. Thereby, it is possible to conveniently implement a decoration excellent in designability on the decorative member in various manners. Also, when the decorative member and the attachment member are assembled, the surface of the end of the decorative member in the longitudinal direction is covered by the cover part of the attachment member. Thereby, even when dimensional errors occur for the decorative member and the attachment member, it is possible to cover and conceal a deviation or gap between the end of the decorative member and the end of the attachment member by the cover part, so that it is possible to prevent deterioration in appearance of the pillar garnish.

In a preferred aspect of the pillar garnish disclosed herein, the supporting wall portion has a concave portion provided on a surface of the supporting wall portion on a center side of the main body part in the longitudinal direction, and the concave portion is recessed from the center side toward an end side of the main body part in the longitudinal direction of the main body part. A portion, which is located on the outer side, of the concave portion of the supporting wall portion configures the covering portion.

According to the invention disclosed herein, in addition to the above effects of the invention, the end of the decorative member is accommodated in the concave portion and is not thus exposed to the outside. Thereby, in addition to the effects of the invention defined in claim 1, it is possible to prevent the end of the decorative member from directly contacting with the other components and the like, so that it is possible to prevent the other components and the end of the decorative member from being broken and damaged.

In a preferred aspect of the pillar garnish disclosed herein, the supporting wall portion has a convex portion protruding toward the end side in the longitudinal direction of the main body part.

According to the above configuration, since it is possible to deepen the concave portion by the convex portion, it is possible to widen a range in which the end of the decorative member is to be covered. Thereby, in addition to the above effects of the invention, even when the deviation or gap between the end of the decorative member and the end of the attachment member is large, it is possible to conceal the deviation or gap by the cover member. Also, it is possible to cover the end of the decorative member by the cover part without reducing an exposed part of the decorative member, so that it is possible to prevent deterioration in appearance.

In a preferred aspect of the pillar garnish disclosed herein, the supporting wall portion has a through-hole penetrating through the supporting wall portion in the longitudinal direction, and a portion, which is located on the outer side, of the through-hole of the supporting wall portion configures the covering portion.

According to the above configuration, in addition to the above effects of the invention, even when the dimensional errors of the decorative member and the attachment member become larger and a portion of the decorative member to be inserted into the through-hole is longer than a thickness of the supporting wall portion, for example, it is possible to cover and conceal the deviation between the end of the decorative member and the end of the attachment member by the cover part.

In a preferred aspect of the pillar garnish disclosed herein, the covering portion extends from the supporting wall portion toward the center side of the main body part in the longitudinal direction.

According to the above configuration, in addition to the above effects of the invention, it is possible to widen the range, in which the end of the decorative member is to be covered, by the extended length. For this reason, in addition to the above effects of the invention, even when the deviation or gap between the end of the decorative member and the end of the attachment member is further larger, it is possible to cover and conceal the deviation or gap.

In a preferred aspect of the pillar garnish disclosed herein, the cover part is formed of a material softer than a material forming the main body part.

According to the above configuration, when assembling the attachment member and the decorative member each other, it is possible to deform the cover part easily and to fit the decorative member. Thereby, in addition to the above effects of the invention, it is possible to implement the assembling of the attachment member and the decorative member with good operability.

In a preferred aspect of the pillar garnish disclosed herein, the attachment member includes a lip portion protruding from the main body part toward at least one of the window pane and the pillar and contacting with the at least one of the window pane and the pillar, and the lip portion is connected to the main body part along the longitudinal direction and is formed integrally with the cover part.

According to the above configuration, when the pillar garnish is attached to the vehicle, it is possible to bring the soft lip portion into contact with the window pane and the pillar. Thereby, in addition to the above effects of the invention, it is possible to prevent abnormal noises due to vibrations and the like. Also, a boundary is not formed between the lip portion and the cover part, so that a favorable outer appearance is obtained.

BRIEF DESCRIPTION OF DRAWINGS

FIG. 1 is a perspective view pictorially depicting an attachment structure of a pillar garnish in accordance with an exemplary embodiment of the present invention.

FIG. 2 is a plan view of the pillar garnish in accordance with the exemplary embodiment of the present invention.

FIG. 3 is a sectional view taken along a line III-III in FIG. 2.

FIG. 4 is a sectional view taken along a line IV-IV in FIG. 2.

FIG. 5A is an exploded perspective view of main parts of the pillar garnish in accordance with the exemplary embodiment of the present invention.

FIG. 5B is a perspective view depicting a state in which the main parts of the pillar garnish of FIG. 5A are assembled.

FIG. 5C is a plan view of the main parts of the pillar garnish.

Part (a) of FIG. 6 is a sectional view taken along a line A-A of FIG. 5B, and parts (b) to (e) of FIG. 6 are sectional views corresponding to the A-A section, in other exemplary embodiments.

DESCRIPTION OF EMBODIMENTS

Hereinbelow, the pillar garnish of the present invention will be described in detail with reference to the drawings, based on a favorable exemplary embodiment. In the meantime, the matters, which are necessary to implement the present invention, except matters particularly mentioned in the specification, can be perceived as design matters of one skilled in the art based on the related art. The present invention can be implemented, based on the matters disclosed in the specification and the drawings and the common technology knowledge in the art.

FIG. 1 is a perspective view depicting an exterior appearance around a front window pane 40 of a vehicle (automobile) to which an elongated pillar garnish 10 in accordance with an exemplary embodiment of the present invention is attached. FIG. 2 is a plan view depicting an overview of a pillar garnish 10R to be mounted on a right side (hereinbelow, sometimes simply referred to as 'pillar garnish 10'). FIGS. 3 and 4 are sectional views taken along a line III-III and a line IV-IV of the pillar garnish 10 shown in FIG. 2. FIGS. 3 and 4 depict an attachment state in which the pillar garnish 10R to be mounted on a right side is mounted in a gap G between a pillar 30R of a right side frame and a side end 40a of the window pane 40. FIG. 5A is an exploded perspective view pictorially depicting a structure of a lower end of the pillar garnish 10R to be mounted on a right side surrounded by a circle in FIG. 2. FIGS. 5B and 5C are an assembled perspective view and a plan view of the lower end of the pillar garnish 10R to be mounted on a right side, as seen from different directions. Part (a) of FIG. 6 is a simplified sectional view taken along a line A-A of FIG. 5B. Parts (b) to (e) of FIG. 6 are sectional views corresponding to the A-A section, in other exemplary embodiments. In FIGS. 3 and 4, "inner side" and "outer side" indicate a vehicle inner side and outer side direction in a state in which the pillar garnish 10 is attached to the vehicle. A reference sign 'X' in the drawings indicates a longitudinal direction of the pillar garnish 10, and a reference sign 'Y' indicates a left and right direction, which is a width direction. Also, a reference sign 'C' indicates a center of the pillar garnish 10 (a main body part 21, which will be described later) in the longitudinal direction X.

As shown in FIG. 1, a front window of the vehicle is configured such that a window pane 40 configuring a window main body is fitted in a state of being gently inclined backward in a window opening 1 of a vehicle body 2. The window opening 1 is typically surrounded by pillars 30L and 30R, which configure left and right side frames of the vehicle, a roof panel 3, a cowl louver (not shown) arranged along a lower edge portion 40b of the window pane 40, and the like. Herein, as shown in FIGS. 3 and 4, the left and right pillars 30L and 30R of the window opening 1 and the window pane 40 are fixed to each other by a sealant 34a, and a dam rubber 34b for suppressing protrusion of the sealant 34a is provided over an entire circumference of the window. However, a predetermined gap G is formed between the pillar 30L, 30R and the side end 40a of the window pane 40, as seen from an external appearance. In order to block the gap G, an elongated pillar garnish 10R to be mounted on a right side and a pillar garnish 10L to be mounted on a left side are attached in a vertical direction from an upper end to a lower end of the left and right side ends 40a of the window pane 40, respectively.

First, a configuration of the pillar garnish 10 in accordance with the exemplary embodiment is described.

As shown in FIGS. 2, 3, and 4, the pillar garnish 10 includes, as a basic configuration, an elongated attachment member 20 and an elongated decorative member 12. The attachment member 20 is a member for attaching the pillar garnish 10 to the gap G. The decorative member 12 is a member configuring an exterior appearance of the pillar garnish 10. The attachment member 20 and the decorative member 12 are prepared as separate constitutional elements. Before mounting the pillar garnish 10 to the vehicle, the decorative member 12 is integrally assembled on a front surface 21s of an outer side of the attachment member 20.

A method of assembling the attachment member 20 and the decorative member 12 is not particularly limited. In the exemplary embodiment, the attachment member 20 and the decorative member 12 are integrally fixed by thermal caulking. Specifically, as shown in FIGS. 2 and 3, the attachment member 20 includes a main body part 21, a rib 22 which will be described later, a lower end 36 including a cover part 23, and lip portions 32, 42. The main body part 21 is a main body which is a framework of the attachment member 20, and extends in the longitudinal direction X. The attachment member 20 has a groove portion 21c having a U-shaped section on the front surface 21s of the main body part 21, in the longitudinal direction X. The decorative member 12 has a decorative portion main body 13 and a protrusion 14. The decorative portion main body 13 is a main body which is a framework of the decorative member 12, and extends in the longitudinal direction X. The protrusion 14 is provided in the longitudinal direction X so as to protrude inwardly from a rear surface 13u, which is an inner side of the decorative portion main body 13. A dimension of the protrusion 14 in the left and right direction Y is smaller than a dimension of the decorative portion main body 13 in the left and right direction Y. A shape of the protrusion 14 of the decorative member 12 corresponds to a concave shape of the groove portion 21c of the attachment member 20. Therefore, when the protrusion 14 of the decorative member 12 is fitted into the groove portion 21c of the attachment member 20, the decorative member 12 and the attachment member 20 can be positioned in predetermined positions with respect to each other without being positionally misaligned in the left and right direction Y largely. In the meantime, the decorative member 12 of the exemplary embodiment has a hollow portion 16 formed therein and extending in the longitudinal direction X. The decorative member 12 is made to have a hollow structure in this way, so that it is possible to reduce a weight of the decorative member 12.

Also, the decorative member 12 has a rod-shaped boss 14b (refer to FIG. 4) protruding inwardly from surface 14u of an inner side of the protrusion 14. The boss 14b is provided in plural in the longitudinal direction X. Although not shown specifically, the number of the bosses 14b is five, in the exemplary embodiment, and the bosses are provided on the surface 14u of the protrusion 14 with equal intervals in the longitudinal direction X. Also, the attachment member 20 has a hole 21t (refer to FIGS. 4 and 5A) penetrating inwardly and outwardly a bottom of the groove portion 21c. The plurality of holes 21t are provided in positions corresponding to the bosses 14b of the decorative member 12, in the longitudinal direction X. In the exemplary embodiment, the number of the holes 21t is five. Preferably, the hole 21t formed on one end side of the attachment member 20 is a circular hole so as to be a reference point of the assembling of the decorative member 12 to the attachment member 20, and the holes formed in the other positions are long holes that are long in the longitudinal direction, considering the dimensional error of the decorative member 12 or the attachment member 20. Therefore, when fitting the protrusion 14 of the decorative member 12 into the groove portion 21c of the attachment member 20, the decorative member 12 and the attachment member 20 can be positioned with respect to each other in predetermined positions without being positionally misaligned in the longitudinal direction X and in the left and right direction Y largely by inserting the bosses 14b of the decorative member 12 into the holes 21t of the attachment member 20.

After fitting the decorative member 12 and the attachment member 20 each other, the bosses 14b are caulked by heat, so that the decorative member 12 and the attachment member 20 are integrally fixed to each other. In the meantime, upon the thermal caulking, in order to stably maintain the positions of the decorative member 12 and the attachment member 20, a double-sided adhesive tape 18 or the like may be used to fix the protrusion 14 of the decorative member 12 and the groove portion 21c of the attachment member 20 each other. Thereby, the decorative member 12 and the attachment member 20 are firmly fixed to each other.

Also, as shown in FIGS. 2 to 4, the lip portions 32, 42 of the exemplary embodiment are provided to portions of the attachment member 20 in the longitudinal direction X, so as to be along the longitudinal direction X. The pillar-side lip portion 32 is formed to protrude from the front surface 21s, which is on the pillar 30R side, of the main body part 21 of the attachment member 20 toward the pillar 30R. A tip portion of the pillar-side lip portion 32 is in contact with a surface of the pillar 30R. Also, the window-side lip portion 42 is formed to protrude from a rear surface 21u of an inner side of the main body part 21 of the attachment member 20 toward a side end 40a of the window pane 40. A tip portion of the window-side lip portion 42 is in contact with a surface of the side end 40a of the window pane 40. The lip portions 32, 42 prevents occurrence of abnormal noises due to vibrations and the like. Also, since the lip portions 32, 42 and the lower end 36 are integrally formed, a boundary between each of the lip portions 32, 42 and the lower end 36 is not formed, so that a favorable outer appearance is obtained.

In the meantime, as shown in FIGS. 3 and 4, the pillar garnish 10 is formed with a rainwater receiving groove portion W having a substantially U-shaped section by the rear surface 13u of the decorative portion main body 13, a side surface, which is on the window pane 40 side, of the main body part 21 of the attachment member 20, the window-side lip portion 42, and the window pane 40. The rainwater receiving groove portion W is formed so that a capacity thereof becomes large downward.

Also, the rib 22 is formed to protrude inwardly from the rear surface 21u of the main body part 21, which is an inner side. The rib 22 is intermittently formed in the longitudinal direction X of the main body part 21. The rib 22 is a reinforcing part for reinforcing the attachment member 20. Also, the rib 22 functions as a fixing part for fixing the attachment member 20 to the pillar 30R. For example, the rib 22 has engaging holes (not shown). Herein, the pillar 30R has engagement members (not shown) such as clips and the like with predetermined intervals corresponding to the engaging holes of the rib 22. The pillar garnish 10 can be mechanically engaged to the pillar 30R by engaging the engaging holes of the rib 22 and the engagement members of the pillar 30R each other.

In the meantime, as shown in FIGS. 5A and 5B, the attachment member 20 of the exemplary embodiment is provided with a lower end 36 that extends from a lower side of the side end 40a of the window pane 40 to a part of the lower edge portion 40b along a peripheral edge of the window pane 40 when the pillar garnish 10 is mounted to the vehicle. Also, the lower end 36 has a cover part 23. The cover part 23 is a part for covering the decorative member 12, and is connected to a downward end 21a of the main body part 21 in the longitudinal direction X.

In the below, the cover part 23 that is a feature of the pillar garnish 10 disclosed herein is described. As shown in FIG. 5B and part (a) of FIG. 6, which is a simplified sectional view taken along a line A-A of FIG. 5B, the cover part 23 has a covering portion 24 and a supporting wall portion 25. The covering portion 24 is a portion that covers at least a part of a front surface 13s of the decorative portion main body 13 when the decorative member 12 is assembled to the attachment member 20. The supporting wall portion 25 is a portion configured to support the covering portion 24. The supporting wall portion 25 is provided in a direction intersecting with the longitudinal direction X of the main body part 21 so as to erect outwardly from the end 21a of the main body part 21. Also, the supporting wall portion 25 of the exemplary embodiment has a convex portion 27 protruding from a center C side in the longitudinal direction X toward the end 21a side. Also, a surface of the supporting wall portion 25 on the center C side in the longitudinal direction X is provided with a concave portion 26 recessed from the center C side in the longitudinal direction X toward the end 21a side. The concave portion 26 is formed continuously inside the convex portion 27. Also, an end 13a of the decorative portion main body 13 is accommodated in the concave portion 26. The end 13a of the decorative portion main body 13 extends to an inside of the convex portion 27. In the exemplary embodiment, the supporting wall portion 25 has the concave portion 26, so that a portion located on the outer side the concave portion 26 functions as the covering portion 24.

The pillar garnish 10 may be favorably formed by an injection molding method using a resin material without being limited thereto. Herein, since each of the decorative member 12 and the attachment member 20 is a member which is a framework of the elongated pillar garnish 10, the decorative member 12 and the attachment member 20 can be favorably formed by a relatively hard polymer material. As the hard polymer material, polyvinyl chloride (PVC) resin, polypropylene (PP) resin, acrylonitrile butadiene styrene (ABS) resin, acrylonitrile ethylene propylene diene styrene (AES) resin, polymethacrylic acid methyl (PMMA) resin and the like may be exemplified.

In the meantime, since the lip portions 32, 42, and the lower end 36 including the cover part 23 may be portions required to be in elastic contact with the pillar garnish 10 and the pillar 30R and window pane 40, the lip portions 32, 42, and the lower end 36 including the cover part 23 are preferably formed of a relatively softer polymer material than the decorative member 12 and the main body part 21 and rib 22 of the attachment member 20. As the soft polymer material, various types of thermoplastic resins and thermoplastic elastomer such as olefin-based resin, styrene-based resin, ester-based resin, polyamide-based resin, vinyl chloride-based resin, urethane-based resin and the like, and various types of rubbers such as natural rubber, ethylene propylene diene (EDPM) rubber and the like may be exemplified. Also, for example, the hardness of the decorative member 12 and the main body part 21 and rib 22 of the attachment member 20 may be set to Rockwell hardness 100, and the hardness of the lip portions 32, 42 and the lower end 36 may be set to durometer type A (Shore A) harness 80 prescribed in JIS K7215.

Since the above materials are all softened to exhibit fluidity when heat is applied thereto, the pillar garnish 10 can be conveniently manufactured into any shape by a variety of known forming methods. Herein, the decorative member 12 and the attachment member 20 are separately formed. For the decorative member 12, a gas assist injection molding method is preferably used without limitation. That is, a mold for injection molding having a shape corresponding to the decorative member 12 is first prepared. Then, a polymer material (for example, ABS resin) is injected and filled in the mold, so that the elongated decorative member 12 having a desired sectional shape can be obtained. At this time, the hollow portion (gas channel) 16 can be formed inside the decorative member 12 by introducing a gas (for example, nitrogen gas).

On the other hand, the attachment member 20 may be manufactured by integrally forming, in one step, (1) the main body part 21 and the rib 22, (2) the lip portions 32, 42 and the lower end 36, and the like, or may be manufactured by separately manufacturing and integrally joining the same, for example, due to a difference of the materials. In order to form (1) the main body part 21 and the rib 22, the injection molding method is preferably used, for example. That is, a mold for injection molding having a shape corresponding to the main body part 21 and the rib 22 is first prepared. Then, a polymer material (for example, AES resin) is injected and filled in the mold. Thereby, an elongated integrated formed product of the main body part 21 and the rib 22 has a desired sectional shape can be obtained as an intermediate product.

Then, in order to form (2) the lip portions 32, 42, the lower end 36 and the like, an insert injection molding method is preferably used, for example, without limitation. That is, a mold for injection molding having a shape corresponding to respective portions of the lip portions 32, 42, the lower end 36 and the like is first prepared. Then, the intermediate product (integrated formed product of the main body part 21 and the rib 22) manufactured in advance is set in the mold. Then, a polymer material (for example, TPO resin) is injected and filled in the mold having the intermediate product set therein, so that the intermediate product is formed with the lip portions 32, 42, the lower end 36 and the like having desired shapes. Thereby, the lip portions 32, 42, the lower end 36 and the like can be welded and integrated to the intermediate product. Thereby, the attachment member 20 of the pillar garnish 10 can be manufactured. Meanwhile, in the exemplary embodiment, the pillar-side lip portion 32 is formed along the front surface 21s of the main body part 21 so as to be coupled to the lower end 36. Also, the window-side lip portion 42 is formed along the rear surface 21u of the main body part 21 so as to be coupled to the lower end 36. Thereby, the lower end 36 and the lip portions 32, 42 are integrally formed.

According to the injection molding method using resin materials, it is possible to integrally form the constitutional elements of different materials, as described above. In this case, in order to firmly joint the intermediate product of the attachment member 20 and the lip portions 32, 42 and lower end 36, they are preferably formed of materials having compatibility each other.

In the meantime, the lip portions 32, 42, the lower end 36 and the like may be individually manufactured by the injection molding method, and then, may be jointed and integrated to the intermediate product manufactured in advance by an adhesive, an adhesive tape or the like. Also, the lip portions 32, 42 may be manufactured by an extrusion molding method.

Also, some of the lip portions 32, 42, the lower end 36 and the like may be welded and integrated to the intermediate product by the injection molding, and the others may be separately formed and then jointed and integrated by an adhesive or the like. For example, the intermediate product and the lip portions 32, 42 may be prepared in advance as separate members, the lower end 36 may be welded and integrated to the intermediate product by the injection molding, and the lip portions 32, 42 may be fixed to the intermediate product by an adhesive tape.

In the pillar garnish 10 of the above exemplary embodiment, the attachment member 20 and the decorative member 12 are configured as separate members. Therefore, it is possible to manufacture the decorative member 12 without limitations on the material and manufacturing method of the attachment member 20. For example, the decorative member 12 may be painted in the same color as a vehicle body, and then, the decorative member 12 may be assembled to the attachment member 20.

Thereby, it is possible to realize the pillar garnish 10 in which decoration excellent in designability is conveniently implemented on the decorative member 12 in various manners.

Also, the elongated attachment member 20 and the decorative member 12 are manufactured by the injection molding method using the resin materials. Therefore, dimensional errors may separately occur between the attachment member 20 and the decorative member 12 due to thermal shrinkage, linear expansion and the like after molding as well as variation in products. However, according to the above-described configuration, the end 13a of the decorative member 12 is covered by the covering portion 24 of the cover part 23 at the end of the pillar garnish 10. Thereby, for example, even when the dimensional errors occur for the decorative member 12 and the attachment member 20 in the longitudinal direction X and thus a gap or deviation occurs between the end 13a of the decorative member 12 and the end 21a of the attachment member 20, it is possible to cover and conceal the deviation or gap between the end 13a and the end 21a by the covering portion 24. Thereby, it is possible to suppress deterioration in appearance of the pillar garnish 10.

Also, in the above exemplary embodiment, the supporting wall portion 25 has the convex portion 27 and the concave portion 26 extending to the inside of the convex portion 27. The end 13a of the decorative portion main body 13 is accommodated in the concave portion 26. The outer side of the concave portion 26 is the covering portion 24. According to this configuration, it is possible to deepen the concave portion 26, and to ensure the long covering portion 24 for covering the end 13a of the decorative portion main body 13. Thereby, even when the deviation or gap occurs between the end 21a of the attachment member 20 and the end 13a of the decorative member 12, it is possible to suppress deterioration in appearance of the pillar garnish 10. Also, the convex portion 27 protrudes toward the end 21a of the attachment member 20 in the longitudinal direction X, and covers the end 13a of the decorative member 12 by a portion located on the outer side the concave portion 26 in the convex portion 27. Thereby, it is possible to suppress deterioration in appearance without reducing an exposed part of the decorative member 12.

According to the above configuration, at least a part of the attachment member 20 located in a position in which the decorative member 12 is to be assembled is covered by the cover part 23 in advance. The cover part 23 (lower end 36) is formed of the material softer than the main body part 21 of the attachment member 20. Also, the cover part 23 is formed of the material softer than the decorative member 12. Thereby, when the decorative member 12 is pressed to the cover part 23 of the attachment member 20, the cover part 23 is elastically deformed by the decorative member 12 easily, so that the decorative member 12 can be assembled to the attachment member 20. Also, when the decorative member 12 passes the cover part 23 after deforming the cover part 23, the cover part 23 is released from the pressed state by the decorative member 12 and immediately returns to the original shape. At this time, an operator can feel an appropriate click feeling at the same time as the decorative member 12 is released from resistance force of the cover part 23 and is accommodated in the cover part 23. Thereby, it is possible to conveniently perform the assembling of the attachment member 20 and the decorative member 12.

According to the above configuration, the lower end 36 and the lip portions 32, 42 are integrally formed. According to the configuration, when the pillar garnish 10 is mounted to the vehicle, a boundary between each of the lip portions 32, 42 and the lower end 36 is not formed, so that a favorable outer appearance is obtained.

Although the specific example of the present invention has been described in detail with reference to the drawings, it is just exemplary and does not limit a scope of the claims. The technology defined in the claims of the present invention includes various changes and modifications of the above specific example.

In the above exemplary embodiment, the cover part 23 has the convex portion 27 and the concave portion 26. However, the configuration of the cover part 23 is not limited thereto. Parts (b) to (e) of FIG. 6 depict other configurations of the cover part 23.

As shown in parts (b) to (e) of FIG. 6, the cover part 23 has the supporting wall portion 25 erected on the end 21a of the main body part 21 in the longitudinal direction X along a direction intersecting with the longitudinal direction X. Herein, as shown in part (b) of FIG. 6, the supporting wall portion 25 of the cover part 23 may have the concave portion 26, which is provided on the surface on the center C side in the longitudinal direction X and is recessed from the center C side toward the end 21a side in the longitudinal direction X. A portion of the concave portion 26 on the outer side configures the covering portion 24 for covering the end 13a of the decorative portion main body 13. Even with this configuration, it is possible to cover the end 13a of the decorative portion main body 13, and to suppress deterioration in appearance of the pillar garnish 10 even when the gap or deviation occurs between the end 13a of the decorative portion main body 13 and the end 21a of the main body part 21 due to the dimensional errors of the decorative member 12 and the attachment member 20. Also, since the end 13a of the decorative portion main body 13 is accommodated in the concave portion 26, it is possible to prevent the end 13a from directly contacting with the other components and the like, so that it is possible to prevent the other components and the end 13a of the decorative portion main body 13 from being broken and damaged.

In the meantime, as shown in part (c) of FIG. 6, the supporting wall portion 25 of the cover part 23 may be formed with a through-hole 28 penetrating through the supporting wall portion 25 in the longitudinal direction X. In this case, a portion of the through-hole 28 of the supporting wall portion 25 on the outer side configures the covering portion 24 for covering the end 13a of the decorative portion main body 13. According to this configuration, even when the dimensional errors of the decorative member 12 and the attachment member 20 become larger and a portion of the decorative member 12 to be inserted into the through-hole 28 is longer than a thickness of the supporting wall portion 25, for example, the end 13a of the decorative portion main body 13 passes through the through-hole 28, so that it is possible to cover and conceal the deviation occurring between the decorative member 12 and the end 21*a* of the attachment member 20 by the cover part 23.

As shown in part (d) of FIG. 6, the covering portion 24 of the cover part 23 may extend from the end of the supporting wall portion 25, which is located on the outer side, toward the center C side in the longitudinal direction X. In this case, the covering portion 24 is located on the outer side the main body part 21. According to this configuration, it is possible to widen a range, in which the end 13*a* of the decorative member 12 is to be covered, by a magnitude of the extension of the covering portion 24. For this reason, even when the deviation or gap occurring between the decorative member 12 and the attachment member 20 is further larger, it is possible to cover and conceal the deviation or gap.

In the meantime, as shown in part (e) of FIG. 6, the supporting wall portion 25 of the cover part 23 may have the concave portion 26, which is provided on the surface on the center C side in the longitudinal direction X and is recessed from the center C side in the longitudinal direction X toward the end 21*a* side, and an end of the supporting wall portion 25, which is located on the outer side, may extend toward the center C side in the longitudinal direction X. According to this configuration, the covering portion 24 for covering the end 13*a* of the decorative portion main body 13 is configured by the outer side portion of the concave portion 26 and the extending portion. Thereby, it is possible to cover the end 13*a* of the decorative member 12 by the wide covering portion 24 having the outer side portion of the concave portion 26 and the extending portion of the covering portion.

In the above description, the front pillar garnish 10R to be mounted on the right side of the front window of the vehicle has been exemplified. However, the similar aspect can be adopted for the front pillar garnish 10L to be mounted on the left side of the front window of the vehicle.

In the above exemplary embodiment, the decorative member 12 and the attachment member 20 are integrally fixed by the thermal caulking. However, the other methods may also be used to fix the decorative member 12 and the attachment member 20. For example, the decorative member 12 and the attachment member 20 may be laser welded to each other.

In the laser welding, a material of one member is configured by a transmissive material through which laser can transmit, and a material of the other member is configured by an absorption material that is to absorb the energy and is to be thus melted. Also, for example, when fitting the attachment member 20 to the engagement members (not shown) such as clips provided to the vehicle body 2, the material of the main body part 21 of the attachment member 20 is preferably configured by a material having higher stiffness than a material of the decorative member 12 so as to prevent damage of the attachment member 20. Therefore, when laser welding the decorative member 12 and the attachment member 20 each other, the decorative member 12 may be configured by polycarbonate, acryl resin or the like, which are transmissive materials, and the main body part 21 of the attachment member 20 may be configured by AES resin or the like, which are absorption materials.

REFERENCE SIGNS LIST

1: window opening
10, 10R, 10L: pillar garnish
12: decorative member
20: attachment member
23: cover part
24: covering portion
25: supporting wall portion
30L, 30R: pillar
40: window pane

The invention claimed is:

1. An elongated pillar garnish configured to be attached to a gap between a peripheral edge portion of a window pane of a vehicle and a pillar of the vehicle, the pillar garnish comprising:
    an elongated attachment member for attaching the pillar garnish to the gap; and
    an elongated decorative member assembled to a front surface side of the attachment member and disposed at an outer side of the vehicle,
    wherein the attachment member includes an elongated main body part, and a cover part provided to at least one end of the main body part in a longitudinal direction,
    wherein the cover part has a covering portion covering at least a part of a front surface of the decorative member, and a supporting wall portion erected from the main body part toward the outer side and configured to support the covering portion, and
    wherein the supporting wall portion is provided along a direction intersecting with the longitudinal direction of the main body part.

2. The pillar garnish according to claim 1,
    wherein the supporting wall portion has a concave portion provided on a surface of the supporting wall portion on a center side of the main body part in the longitudinal direction, the concave portion being recessed from the center side toward an end side of the main body part in the longitudinal direction of the main body part, and
    wherein a portion, which is located on the outer side, of the concave portion of the supporting wall portion configures the covering portion.

3. The pillar garnish according to claim 2,
    wherein the supporting wall portion has a convex portion protruding toward the end side in the longitudinal direction of the main body part.

4. The pillar garnish according to claim 1,
    wherein the supporting wall portion has a through-hole penetrating through the supporting wall portion in the longitudinal direction, and
    wherein a portion, which is located on the outer side, of the through-hole of the supporting wall portion configures the covering portion.

5. The pillar garnish according to claim 1,
    wherein the covering portion extends from the supporting wall portion toward a center side of the main body part in the longitudinal direction.

6. The pillar garnish according to claim 1,
    wherein the cover part is formed of a material softer than a material forming the main body part.

7. The pillar garnish according to claim 1,
    wherein the attachment member includes a lip portion protruding from the main body part toward at least one of the window pane and the pillar and contacting with the at least one of the window pane and the pillar, and
    wherein the lip portion is connected to the main body part along the longitudinal direction and is formed integrally with the cover part.

\* \* \* \* \*